United States Patent [19]
Johary et al.

[11] Patent Number: 5,285,192
[45] Date of Patent: Feb. 8, 1994

[54] COMPENSATION METHOD AND CIRCUITRY FOR FLAT PANEL DISPLAY

[75] Inventors: Arun Johary; Tetsuji Oguchi, both of San Jose, Calif.

[73] Assignees: Chips and Technologies, Inc., San Jose, Calif.; ASCII Corporation, Tokyo, Japan

[21] Appl. No.: 815,840

[22] Filed: Dec. 30, 1991

Related U.S. Application Data

[63] Continuation of Ser. No. 617,483, Nov. 21, 1990, abandoned, which is a continuation of Ser. No. 245,866, Sep. 16, 1988, abandoned.

[51] Int. Cl.$^5$ .............................................. G09G 5/00
[52] U.S. Cl. .................................... 345/3; 345/132
[58] Field of Search .............. 340/716, 717, 723, 731, 340/735, 771, 784, 793, 812, 790, 805

[56] References Cited

U.S. PATENT DOCUMENTS

| | | |
|---|---|---|
| 3,590,156 | 6/1971 | Easton . |
| 3,845,243 | 10/1974 | Schmersal et al. . |
| 3,863,023 | 1/1975 | Schmersal et al. . |
| 4,121,283 | 10/1978 | Walker . |
| 4,323,891 | 4/1982 | Akashi . |
| 4,338,597 | 7/1982 | Steiner et al. . |
| 4,399,435 | 8/1983 | Urabe . |
| 4,563,676 | 1/1986 | Leininger . |
| 4,563,746 | 1/1986 | Yoshida et al. . |
| 4,626,837 | 12/1986 | Priestly . |
| 4,651,146 | 3/1987 | Lucash et al. . |
| 4,684,935 | 8/1987 | Fujisaku et al. . |
| 4,688,031 | 8/1987 | Haggerty . |
| 4,703,318 | 10/1987 | Haggerty . |
| 4,716,405 | 12/1987 | Yamaguchi ..................... 340/723 |
| 4,730,186 | 3/1988 | Koga et al. ..................... 340/716 |
| 4,739,313 | 4/1988 | Oudshoorn et al. . |
| 4,742,346 | 5/1988 | Gillette et al. . |
| 4,746,981 | 5/1988 | Nadan et al. ..................... 340/731 |
| 4,751,502 | 6/1988 | Ishii et al. ..................... 340/784 |
| 4,757,441 | 7/1988 | Buckland et al. ..................... 340/717 |
| 4,760,387 | 7/1988 | Ishii et al. ..................... 340/716 |
| 4,808,991 | 2/1989 | Tachiuchi et al. ..................... 340/793 |
| 4,827,255 | 5/1989 | Ishii ..................... 340/793 |
| 4,855,728 | 8/1989 | Mano et al. ..................... 340/805 |
| 4,980,678 | 12/1990 | Zenda ..................... 340/805 |
| 4,990,902 | 2/1991 | Zenda ..................... 340/731 |
| 4,990,904 | 2/1991 | Zenda ..................... 340/771 |

FOREIGN PATENT DOCUMENTS

| | | |
|---|---|---|
| 0208321 | 5/1984 | Fed. Rep. of Germany ...... 340/717 |
| 2085257 | 9/1984 | United Kingdom . |

*Primary Examiner*—Richard Hjerpe
*Attorney, Agent, or Firm*—Townsend and Townsend Khourie and Crew

[57] ABSTRACT

A video controller for a personal computing system. The controller compensates CRT video information to generate a display compatible with a flat panel device. The controller includes registers and logic circuits which compensate CRT address information. The compensated addresses are used to repeat lines of display, insert blank lines between lines of display, center a display, and force font types.

7 Claims, 10 Drawing Sheets

FIG._4.
HORIZONTAL COMPENSATION

FIG._5.
VERTICAL COMPENSATION

COMPENSATION METHOD AND CIRCUITRY FOR FLAT PANEL DISPLAY

This is a continuation of Ser. No. 07/617,483 filed Nov. 21, 1990, now abandoned, which was a continuation of Ser. No. 07/245,866, filed Sep. 16, 1988, which was abandoned.

The invention relates to a video graphics controller for a personal computing system. More particularly, a controller is caused to repeat lines of display, insert blank lines between lines of display, and center lines of display to make CRT display information compatible for display by a flat panel device.

BACKGROUND OF THE INVENTION

The typical personal computing system employs a central processing unit, a video controller, and a video display device. The central processing unit provides address, data, and clock information to the video controller which interacts with the system memory to ultimately control the images displayed by the video display device.

Traditionally, personal computing systems have used cathode ray tube (CRT) type display devices. More recently however many manufacturers and vendors have employed flat panel display devices because flat panel devices have certain advantages over CRT's. For example, flat panel displays are lightweight and can be fabricated more compactly than can CRT devices.

The availability of both CRT and flat panel display devices has created several problems for manufacturers of personal computing systems and video controllers. Many of these problems stem from an essential difference between the flat panel display and the CRT display: the flat panel display has a slower response time and other limiting display characteristics because it is a chemically operative system. In contrast, the CRT is an electrically operative system. As one example, a CRT display is amenable to any number of horizontal and vertical lines of display, whereas the typical flat panel display can only handle a set number of vertical and horizontal display lines. On the other hand in order to keep down costs and proliferation of models and hardware, manufacturers of processor systems and controllers prefer not to design a different processor and video graphics controller to cover each CRT and flat panel display which may be included in a vendor's product line. It is similarly undesirable to reconfigure or recompute information during normal processing because a different display device is being used in the system.

Thus there exists a need for a system and method for driving both a CRT and flat panel display without involving a significant proliferation of hardware or disruption to normal processing.

Prior art patents known to applicant neither teach nor suggest any method or system for resolving the forgoing problems. U.S. Pat. No. 4,121,283 describes a display having a standard television type screen. The resolution is very low and the disclosure describes storing an image in memory in coded form and then displaying the image with real time decoding.

U.S. Pat. No. 4,399,435 describes a dual buffered alphanumeric system. A method of accessing memory in the blank intervals between two rows on the screen is disclosed.

U.S. Pat. No. 4,746,981 describes a method for sampling the video output from a television type display controller, and then expanding the image to fit a smaller portion of the image on an entire screen. This invention operates in an "interlaced" environment, does not teach or suggest a programmable or intelligent method for stretching an image, appears limited to an interlaced environment, and requires capture of the video output.

SUMMARY OF THE INVENTION

The invention is a video controller and method useful in a data processing system of the type having a processor, a video display device, a memory for storing video information, and a video display controller. The controller is of the type which receives address, data, and clock information from the processor, retrieves video information from the memory, and provides video information to the display device to generate a video display. The controller includes registers and logic circuits which compensate CRT address information. The compensated addresses are used to repeat lines of display, insert blank lines between lines of display, center a display, and force font types.

In a broad aspect the invention is a controller that includes an identification circuit, a plurality of display compensation circuits, and a compensation select circuit which permit alteration of CRT video information to provide video information compatible with a flat panel display.

The identification circuit receives information from the display device and generates display identification information. Each display compensation circuit is programmed to generate unique display compensation information. The select circuit receives the display identification information and the display compensation information from the display compensation circuits. The select circuit has an output that is the display compensation information corresponding to the device identified by the identification information.

The controller uses the display compensation information to generate video information compatible with the identified device.

In a narrower aspect the display compensation information is used to generate compensation logic information. An address generator uses the compensation logic and CRT address information received from the processor to generate video address information compatible for a flat panel.

In one embodiment of the invention, the identification circuits are programmed by the processor during system power up. In another embodiment, compensation logic information causes lines to be inserted in CRT video information so that the information is compatible with display by a flat panel. In another embodiment, the compensation logic information formats the video information for a text display or graphics display. In another embodiment, the compensation logic information formats the video information for a particular font type.

In another aspect, the invention is a method for compensating video address information to control a video display. The method determines whether the display device is a CRT or a flat panel display device. If the display device is a CRT device, no compensation is provided. If the display device is a flat panel display, the method also determines the flat panel size relative to a preferred display size. If the panel size is equal to the preferred display size, no compensation is provided. However, the method provides compensation when the panel size is greater than the preferred display size.

In various embodiments of the method, the compensation step includes vertically centering a graphics display, forcing the display to exhibit a preferred pixel font size, repeating horizontal lines of display, inserting blank horizontal lines of display, horizontally centering the display, and any combination of the foregoing.

Additional features and advantages of the invention will become apparent by reference to the following brief description, the detailed description and the appended claims.

DETAILED DESCRIPTION

Figure 1:
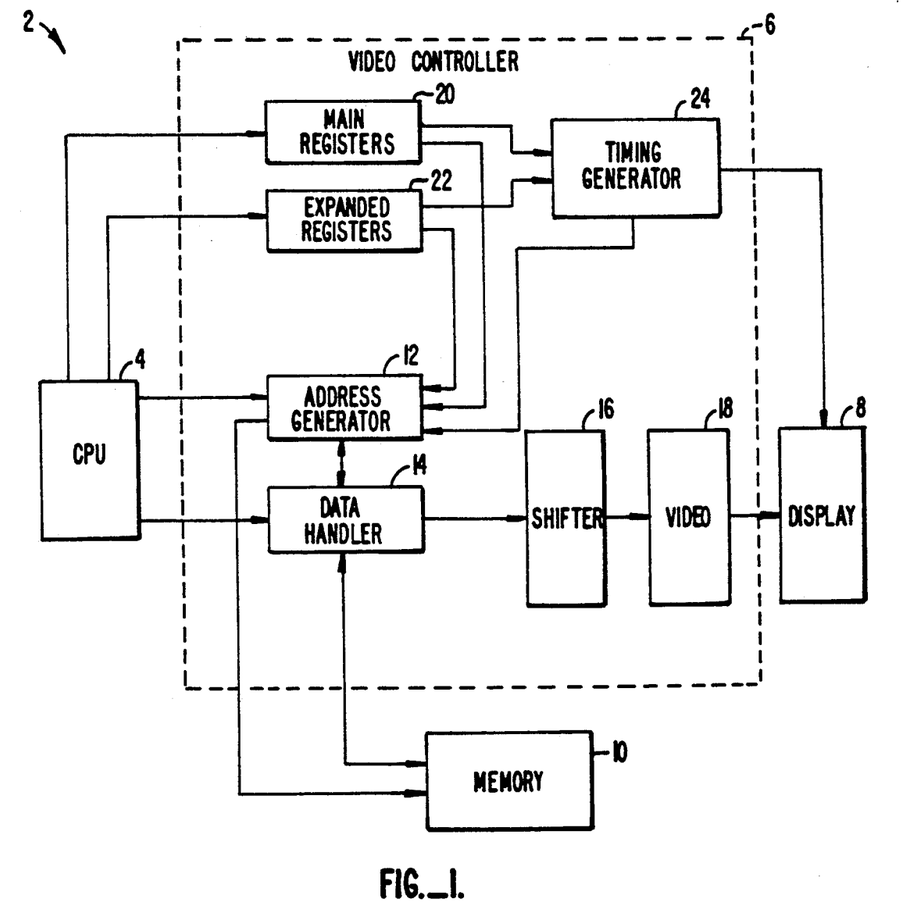
FIG. 1 is a block diagram of a data processing system including a controller according to one embodiment of the invention.
Figure 2:
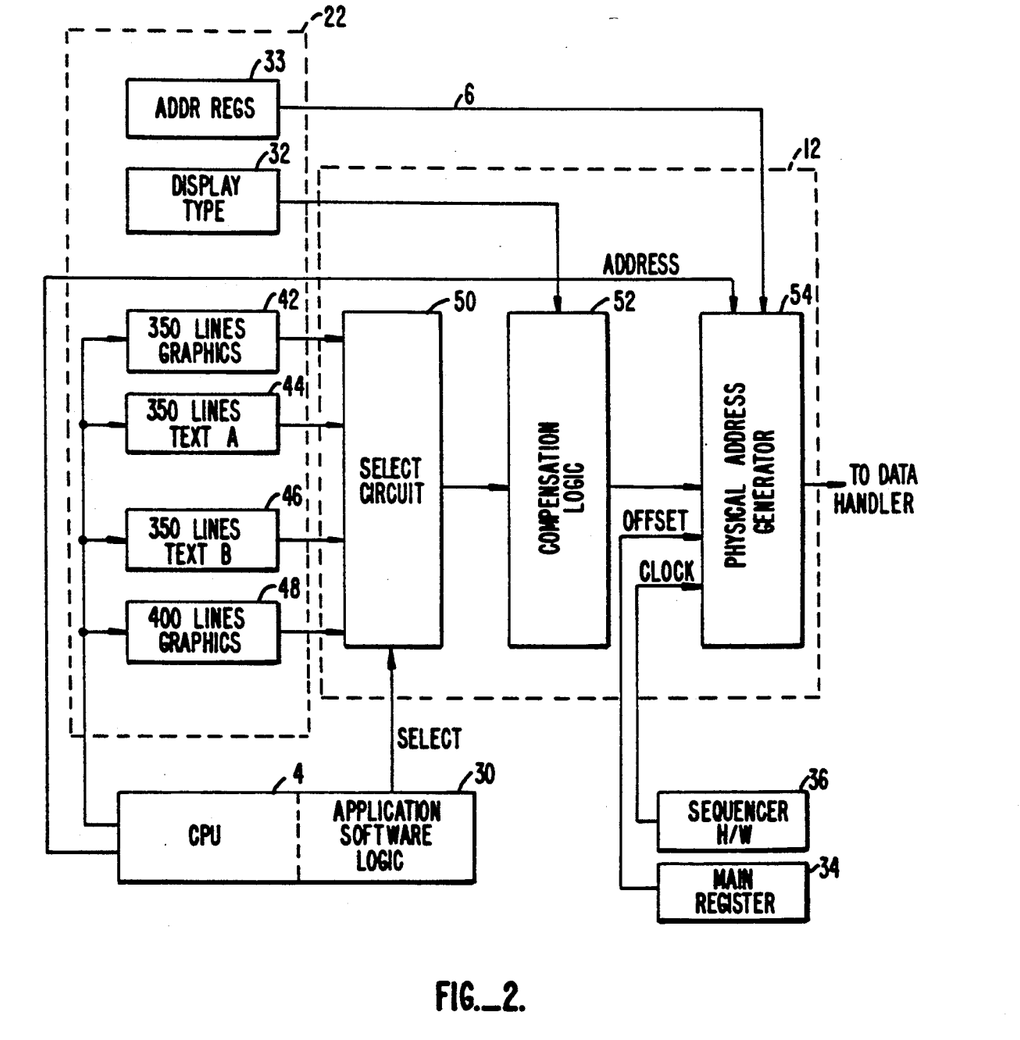
FIG. 2 is a block diagram of a controller having an address generator according to one embodiment of the invention.
Figure 3:
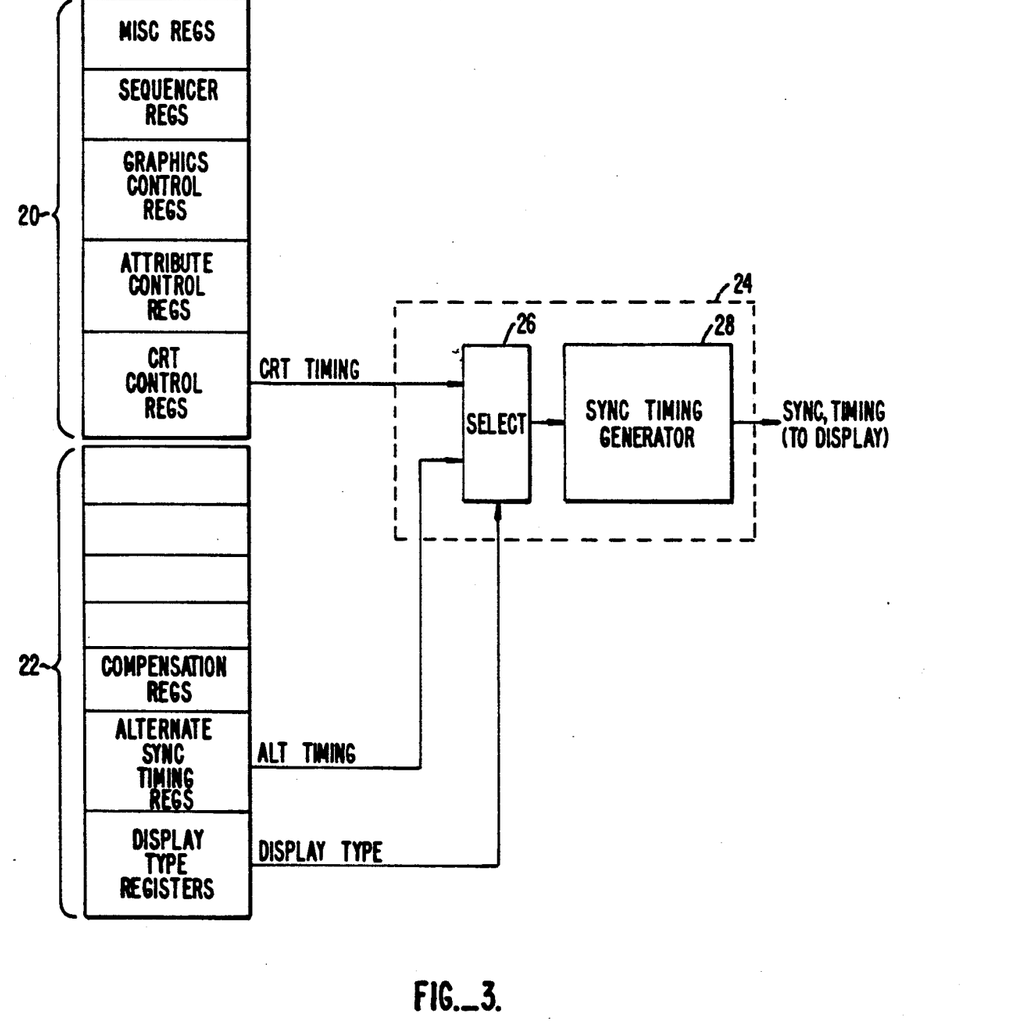
FIG. 3 is a block diagram of a timing generator for a CRT and flat panel display useful with embodiments of the invention.
Figure 4:
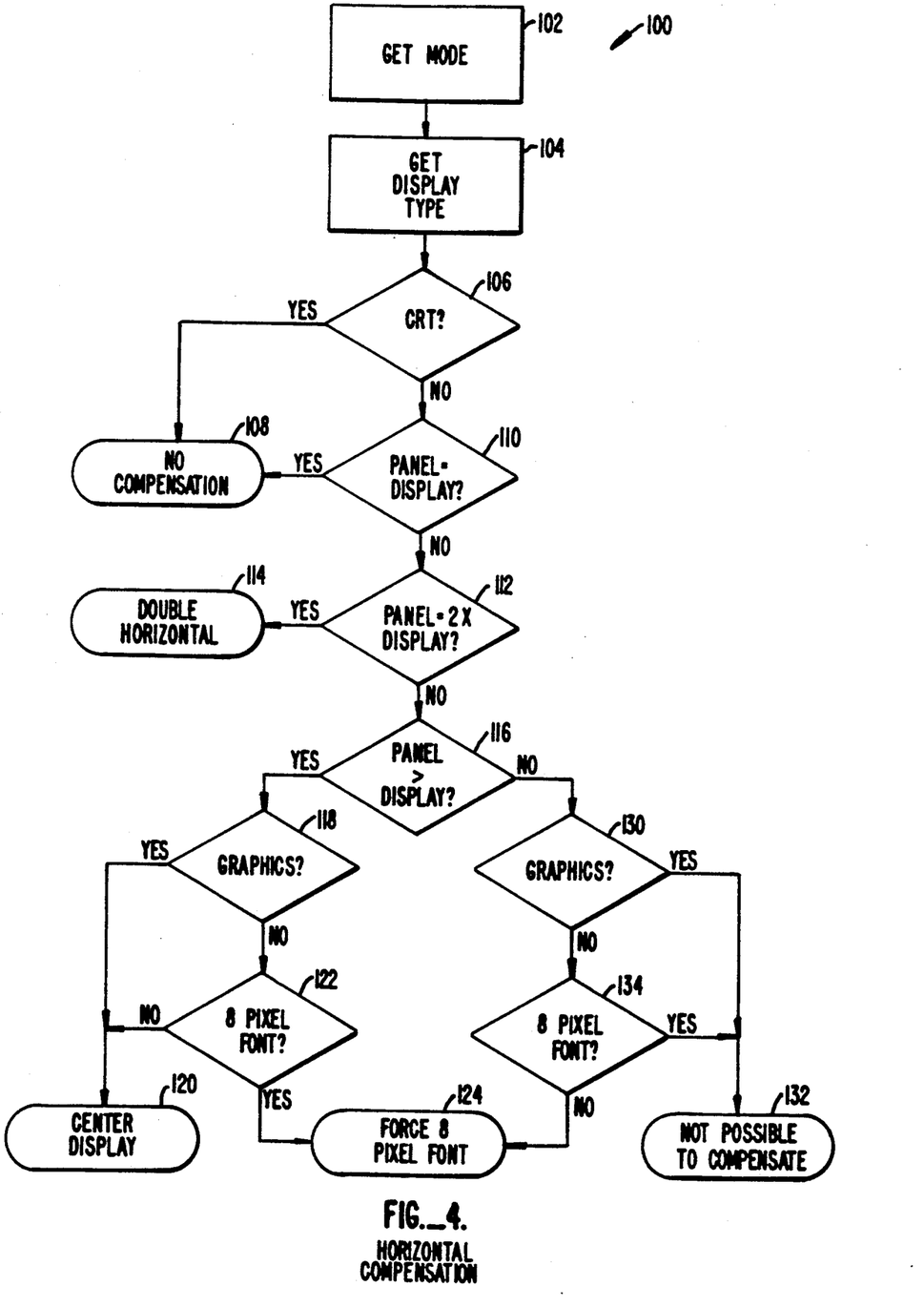
FIG. 4 is a flow diagram of a method for providing horizontal compensation according to one embodiment of the invention.
Figure 5:
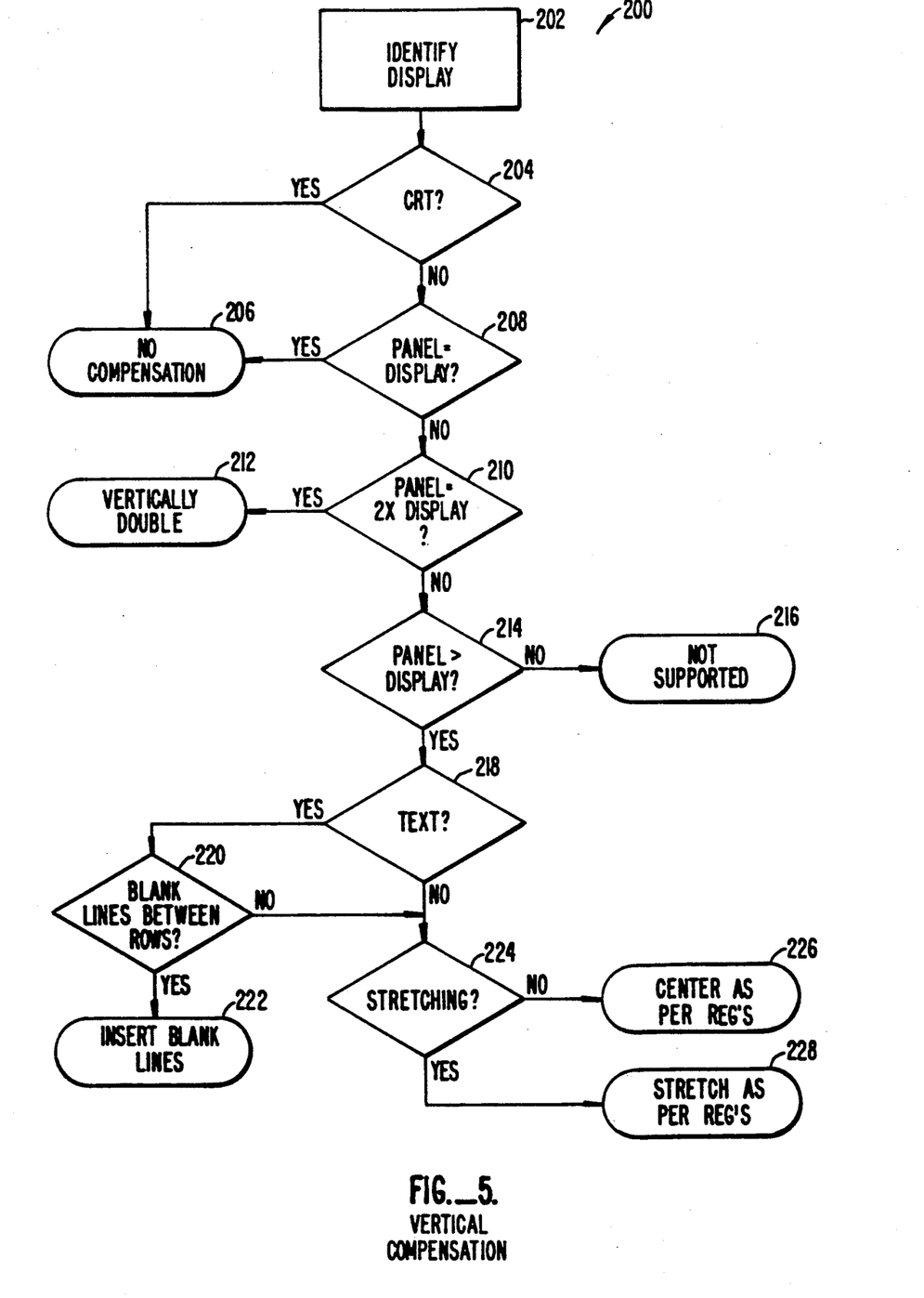
FIG. 5 is a flow diagram of a method for providing vertical compensation according to one embodiment of the invention.
Figure 6:
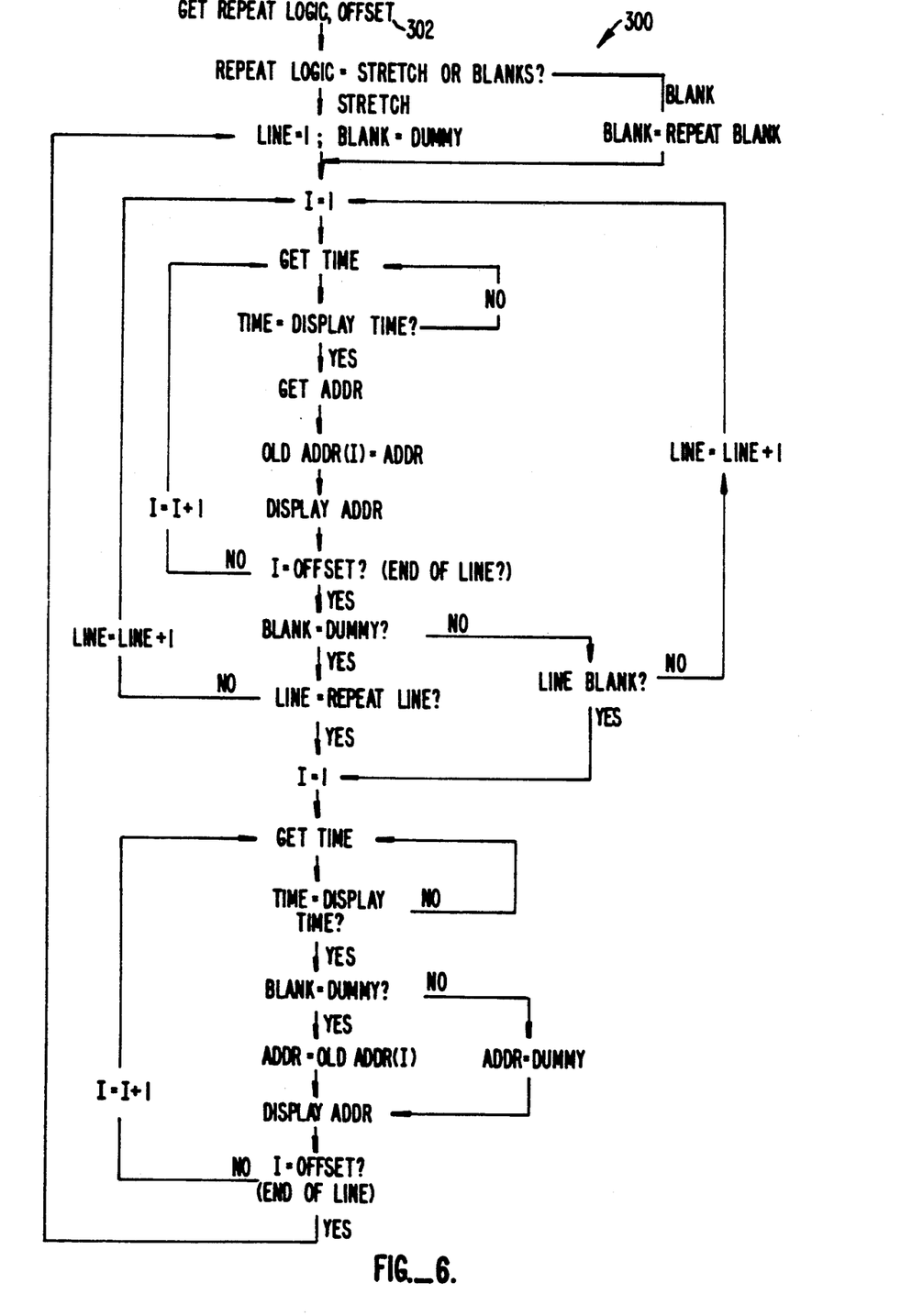
FIG. 6 is a flow diagram of a method for inserting blank lines and repeating lines according to one embodiment of the invention.

The invention will be explained first by reference to the operation of expanded (compensation) registers in a controller as shown in FIG. 1. The invention will next be explained by reference to the use of compensation information to generate address information as shown in FIG. 2. The invention will be further explained by reference to a circuit for generating sync timing signals for a flat panel and a cathode ray tube type display as shown in FIG. 3. The invention will next be explained by reference to methods for determining whether to provide horizontal and vertical compensation as shown in FIGS. 4 and 5. The invention will then be explained by reference to a method for generating video addresses to insert blank lines according to one embodiment of the invention as shown in FIG. 6. The invention will then be explained by reference to specific circuits for providing compensation as shown in FIGS. 7-10.

"Compensation" as used herein means modifying the video information used to control a preferred display device (such as a CRT) to generate video control information compatible with an alternate display device (such as a flat panel display). Compensation includes causing insertion of blank lines, centering a display, repeating lines of display, and similar such reconfigurations of lines of video display. Compensation also includes forcing a particular font or text type.

FIG. 1 shows a data processing system 2 that includes a processor 4, a video controller 6, a display device 8, and a memory 10. Controller 6 includes conventional components such as a CRT address generator 12, a data handler 14, a shifter 16, a video generator 18, a plurality of main registers 20, and a timing generator 24.

Main registers 20 normally receive address, data, control, and clock information from processor 4. CRT address generator 12 receives address information from the processor 4 and main registers 20. Data handler 14 receives address and data information from the processor 4 and address information from the address generator 12. Data handler 14 transfers data into and fetches data from memory 10. Data handler 14 outputs video information for a number of pixels in the display to shifter 16. Shifter 16 sequentially outputs the data for one pixel at a time according to conventional techniques. Shifter 16 provides the shifted video information to video generator 18 which provides video control information to display 8. Main registers 20 also provide timing information to timing generator 24 in controller 6. Timing generator provides video timing signals to display 8.

According to the invention, a plurality of expanded registers 22 compensate the video information received from processor 4 by controller 6. The expanded registers generate compensation information that is used, for example, to generate new video addresses. The compensation information is used to reconfigure video information in a manner compatible with a particular display device (flat panel) or display mode to be used in a given processing system.

Expanded registers 22 may also include registers for providing alternate timing information such that timing control signals are generated that are compatible with, for example, a flat panel display. Expanded registers 22 are normally programmed by processing unit 4 during initial system power up. Expanded registers 22 output alternate video address and video timing information that is used to compensate the normal information such that CRT information will be compatibly displayed on a flat panel display.

FIG. 2 is a block diagram of a system for generating video address information according to one embodiment of the invention. FIG. 2 shows processor 4 and portions of video controller 6. Processor 4 provides address information to a physical address generator 54 and programs extended registers 22 upon system power up.

Extended registers 22 include compensation registers that generate compensation information corresponding to a number of display devices and display modes. These registers include, for example, a 350 line graphics register 42, a 350 line text A register 44, a 350 line text B register 46, and a 400 line graphics register 48. Each of the compensation registers generates compensation information output that is provided to address generator 12. Address generator 12 includes a compensation select circuit 50, a compensation logic circuit 52, and a physical address generator 54.

Compensation registers 22 provide compensation information to compensation select circuit 50. In addition, application software logic in the processing unit generates compensation select information that is provided to compensation select circuit 50. Compensation select circuit 50 decodes the compensation select signal to provide as output the compensation information corresponding to the compensation mode selected. The selected compensation information is provided by compensation select circuit 50 to a compensation logic circuit 52.

Compensation logic circuit 52 receives the selected compensation information. In addition, a display type register 32 provides display type identification information (e.g. text vs. graphics, flat panel vs. CRT) to the compensation logic circuit 52. (The display type register may be one of the extended registers 22). In one embodiment, compensation logic circuit 52 will initiate compensation logic only if the display type is a flat panel display. The compensation logic information is provided by compensation logic circuit 52 to physical address generator 54.

Physical address generator 54 receives address information from processor 4 and a main register 34, and clock information from the sequencer 36. Physical address generator 54 uses the address information and the compensation logic information to generate video address information that is provided to the data handler. In effect, address generator 54 changes the normal addresses as used for a CRT to different addresses to achieve compensation (i.e., compatibility) for a flat panel display.

FIG. 3 shows a timing generator 24 according to one embodiment of the invention. Timing generator 24 includes a select circuit 26 and a sync timing generator 28. Timing generator 24 receives CRT timing information from a CRT control register in main register array 20. Select circuit 26 also receives a flat panel timing signal from an alternate sync timing register in expanded register array 22. Select circuit 26 also receives a display type identification signal that indicates whether the display device is a flat panel or CRT type display. When the display type is a CRT, select circuit 26 provides CRT timing information to sync generator 28. When the display type is a flat panel display, select circuit 26 provides panel timing information to sync timing generator 28. Sync timing generator 28 provides sync timing to the display device.

FIG. 4 is a logic flow diagram of a horizontal compensation method 100 according to one embodiment of the invention. As shown in FIG. 4, the method 100 initially determines the compensation mode in step 102 and then identifies the display type in step 104. If the display is determined to be a CRT at step 106, then no compensation is provided as shown in step 108. If the display is determined to be a CRT at step 106, compensation may be provided depending on additional inquiries.

The panel size is next compared to the display size in a series of steps beginning at step 110. If the panel size is determined at step 110 to be equal to the display size, then no compensation is provided. If the panel size is determined to be not equal to the display size at step 110, then step 112 determines if the panel is equal to two times the display size.

If the panel size is equal to two times the display size, then the compensation logic will cause the horizontal display to be doubled at step 114. However if the panel size is not equal to two times the display size, then the method determines whether the panel is greater than the display size at step 116. If the panel size is greater than the display size the method next determines whether or not the display is a graphics display at step 118.

If the display is a graphics display, the display is then centered at step 120. If the display is not a graphics display, the method next determines whether or not 8 pixel font is desired at step 122. If 8 pixel font is not desired, then the display is centered. However, if 8 pixel font is desired then the method forces 8 pixel font at step 124.

Returning to step 116, if the panel size is not greater than the display size, the method then determines whether the display is a graphics display at step 130. If the display is a graphics display, then the method according to this embodiment will not compensate as shown at step 132. Such a decision may be followed by an interrupt or some other exceptional step. If the display is not a graphics display, then the method determines whether or not 8 pixel font is desired at step 134. If 8 pixel font is desired then the method forces 8 pixel font. If 8 pixel font is not desired the method will not compensate.

FIG. 5 shows a logic flow diagram of a method 200 for achieving vertical compensation according to one embodiment of the invention. The method shown in FIG. 5 is similar in logic to the method shown in FIG. 4 and its operation is readily apparent to one skilled in the art in view of the invention, this disclosure, and the figures. Method 200 provides vertical compensation by inserting blank lines at step 222, stretching, (i.e., repeating) lines at step 228, and centering the display at step 226.

FIG. 6 is a logic flow diagram of a method for inserting blank lines and for repeating lines according to one embodiment of the invention. Operation of the method is apparent to one skilled in the art in view of the invention. The method 300 increments the columns in a line until the end of a line i.e., "the offset" is reached. When the end of line reached, the method determines whether a blank line or a repeat line is required. If the repeat logic indicates that the next line should not be a blank line or a repeated line, the line count is incremented and the addresses corresponding to columns in the next line are re-incremented and displayed. If the next line should be a blank line, then all the addresses corresponding to the columns in the next line are directed to blank data in the memory, causing blanks to be displayed for the next line at the display. If the logic requires the next line to be repeated, then the address corresponding to each column in the next line is made the same as the address for the corresponding column in the previous line.

FIGS. 7-10 are circuit diagrams of controller subsystems for providing: insertion of horizontal blanks to center a display; insertion of vertical blanks to center a display; line compensation logic; and a physical address generator.

Figure 7:
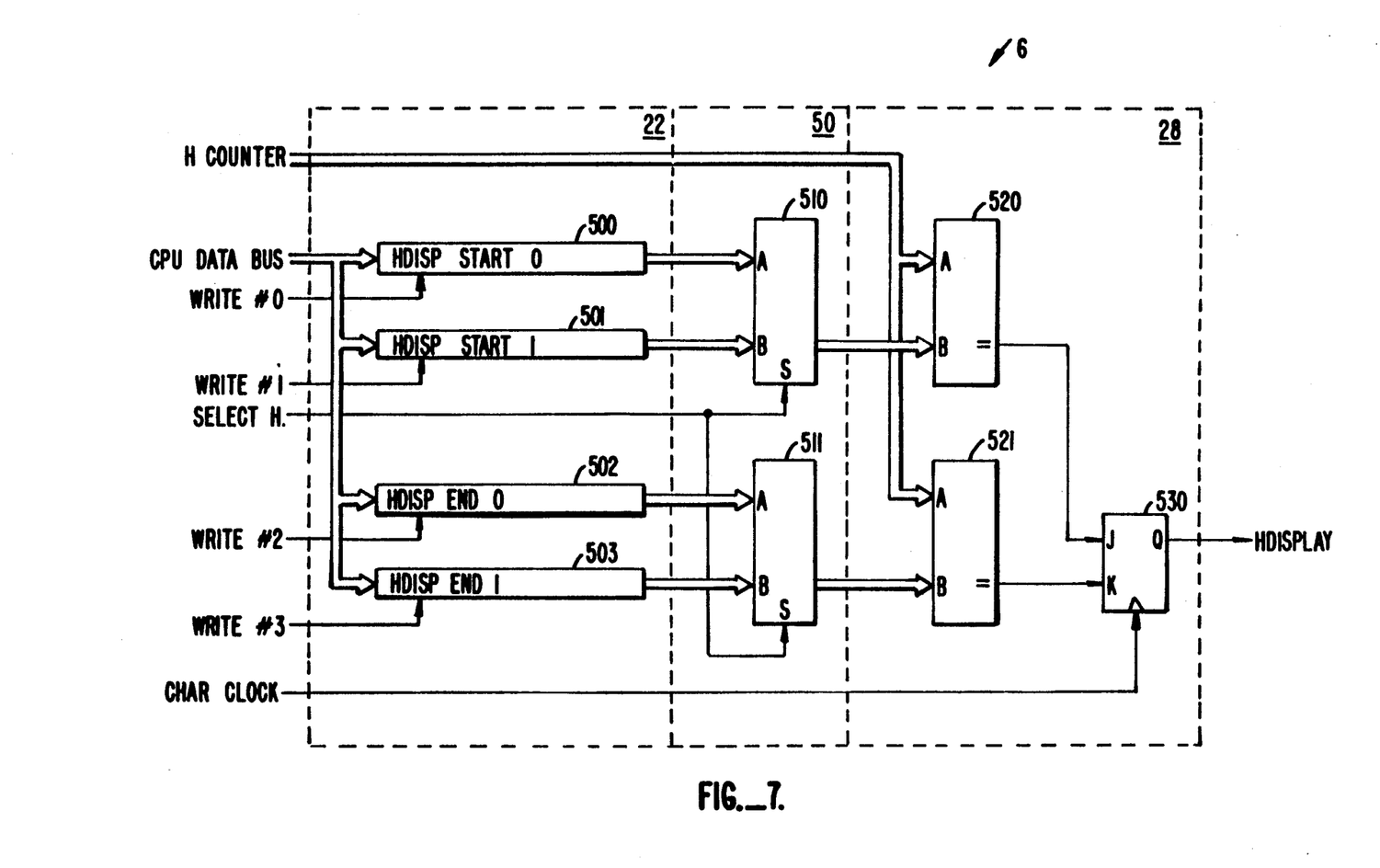
FIG. 7 is a circuit diagram of a circuit for inserting horizontal blanks according to one embodiment of the invention.

FIG. 7 shows a controller 6 having a plurality of expanded registers 22 for providing horizontal blank insertion for centering of a display. As shown in FIG. 7 a select H signal is provided from the central processing unit to the controller based on a comparison between the display size normally applicable for the application software and the physical panel size actually in use or to be used. Extended registers 22 includes two sets of registers: 500 and 501, and 502 and 503. Registers 500 and 501 contain alternative horizontal display start information. Registers 502 and 503 contain alternative horizontal display end information. The contents of registers 500 and 501 are provided to a select circuit 510. The contents of registers 502 and 503 are provided to a select circuit 511. The select H signal provided from the processor causes selection of horizontal display start information and horizontal display end information from the two sets of registers depending on the size comparison preciously mentioned.

The select register output is provided to comparators 520 and 521. Comparators 520 and 521 also each have horizontal counter information connected to another of their inputs. As soon as comparator 520 detects a coincidence between its inputs, its output is enabled. Similarly, when comparator 521 detects a similar coincidence, its output is enabled. The outputs of comparators 520 and 521 are provided to respective J and K inputs of a JK flip-flop 530. JK flip-flop 530 outputs an active horizontal display signal during the horizontal display period determined by the selected start and end information.

Figure 8:
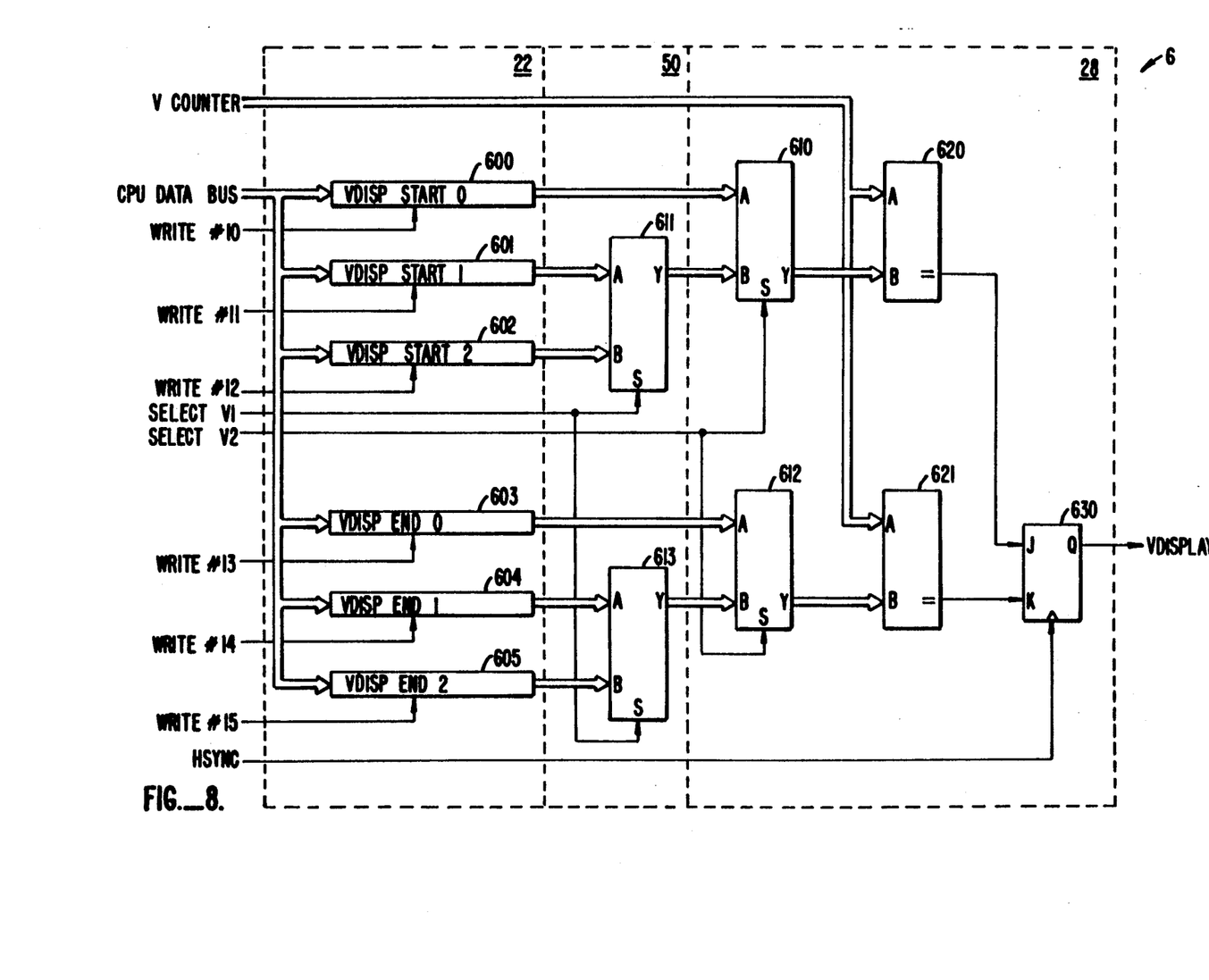
FIG. 8 is a circuit diagram of a circuit for inserting vertical blanks according to one embodiment of the invention.

FIG. 8 shows a controller 6 having a plurality of registers 22 for inserting vertical blanks to compensate a CRT video information for a flat panel display. The expanded registers 22 include three sets of registers: display start and end registers 600 and 603; display start and end registers 601 and 604; and display start and end registers 602 and 605. Compensation information from one of the three sets of registers is selected by select signals select V1 and select V2 provided from the processor (not shown). These signals are provided based on a comparison between the display size normally applicable for the application software and the actual panel size.

The selected register outputs are provided to comparators 620 and 621. Vertical counter information is provided to another input to each of comparators 620 and 621. As soon as either of comparators 620 and 621 detects a coincidence as it input, its output is enabled. The output of comparators 620 and 621 are connected to the J and K inputs respectively of a JK flip-flop 630. JK flip-flop 630 outputs an active signal during a vertical display period determined by the selected vertical start and vertical end compensation information.

Figure 9:
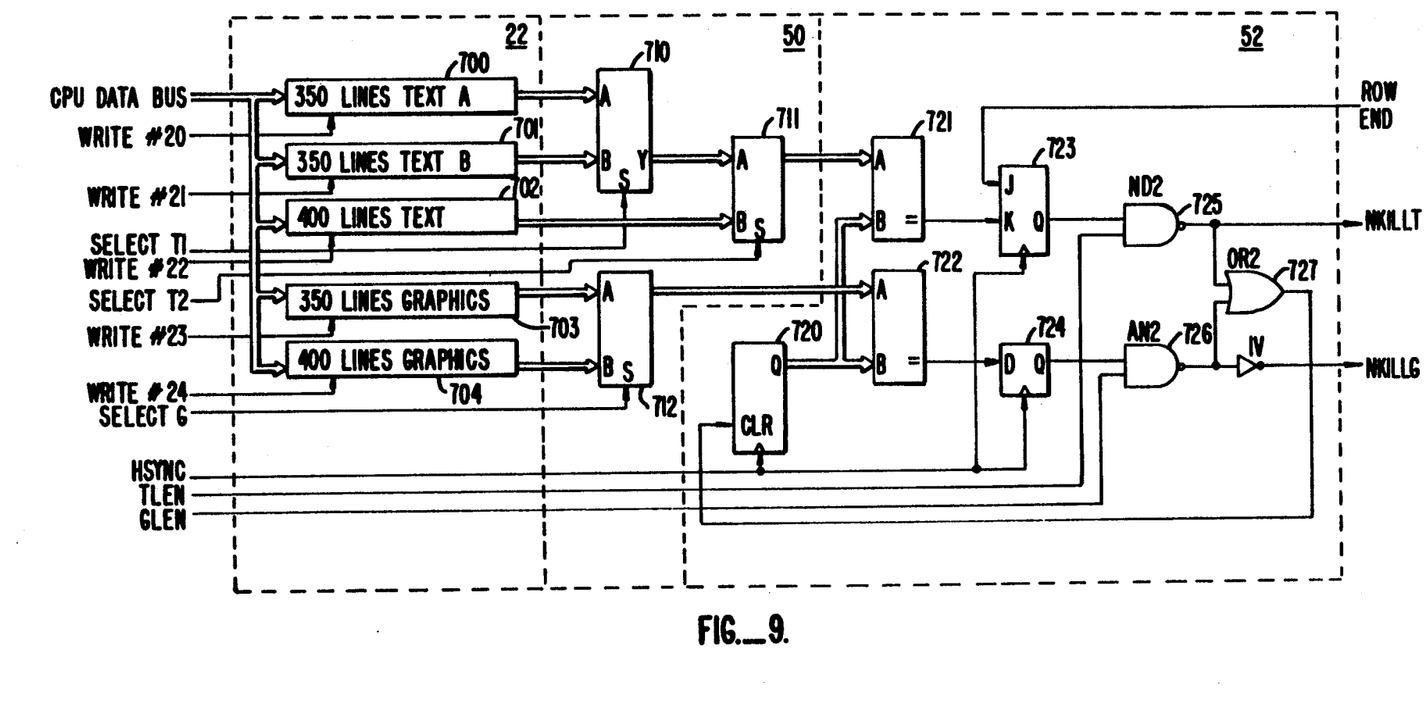
FIG. 9 is a circuit diagram of a compensation logic circuit according to one embodiment of the invention.

FIG. 9 shows a compensation logic circuit included within the controller according to one embodiment of the invention. This embodiment depends on two selection signals which are generated by the processor depending on whether text or graphics display is to be compensated. In case compensation of a text display is desired by the application software, a control signal, TLEN, becomes active. In case compensation of a graphics display is selected, a control signal, GLEN, becomes active. These signals determine which compensation registers and associated circuits are used.

In the case of text compensation, a counter 720 counts the number of blank lines to be inserted between two rows as determined from a count pulse, HSYNC.

The output of counter 720 is provided to comparators 721 and 722. Comparators 721 and 722 also receive selected text or graphics compensation information. A control signal, ROW END, which is generated at the end of each of row display, is provided to the J input of a JK flip-flop 723. When JK flip-flop 723 receives the ROW END signal, the output of JK flip-flop 723 become active. This in turn causes the clear signal of counter 720 to become inactive. The count of blank lines to be inserted starts again and continues until comparator 721 detects a coincidence condition at its inputs, i.e., between the counter output and the compensation information select register.

When the output of JK flip-flop 723 is active, the output of a NAND gate 725, NKILLT, goes low. NKILLT is connected to a physical address generator (not shown) and is used to stop the row count and address calculations (as will be discussed in more detail later).

Referring still to FIG. 9, in the case of graphics compensation, counter 720 counts the display line repetition rate, to provide a count of the number of display lines. As soon as a display starts, counter 720 begins counting. When the value of counter 720 and the compensation information in a selected register coincide, the output of comparator 722 goes high for one display line. This output is provided to the D input of a delay flip-flop 724. Flip-flop 724 also receives an HSYNC signal at its clock input. When signal HSYNC becomes active (each display line), the output of delay flip-flop 724 will go high. The output of flip-flop 724 is provided to an AND gate 726. Since AND gate 726 also receives an active GLEN signal, the output of AND gate 726 will go high when the output of flip-flop 724 goes high. Control signal NKILLG, which is provided to the physical address generator, thereby becomes active and stops the row count and address calculations (as discussed in more detail hereafter).

Figure 10:
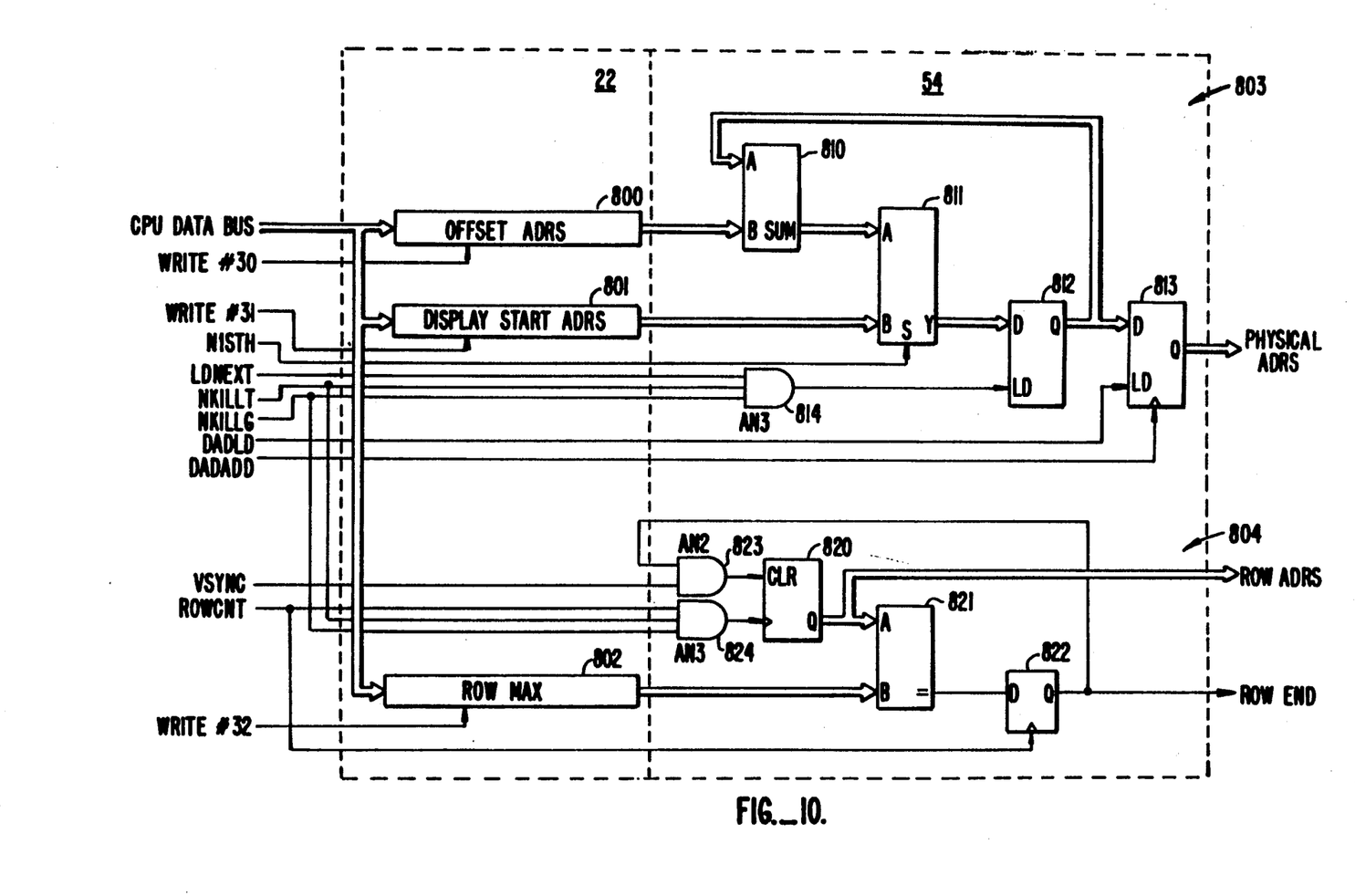
FIG. 10 is a circuit diagram of a physical address generator according to one embodiment of the invention.

FIG. 10 shows a physical address generator according to one embodiment of the invention. The address generator has two major subsections: a display address counter 803 which is shown in the upper portion of FIG. 10, and a row counter 804 shown in the lower portion of FIG. 10.

Row counter 804 is used mainly in the text mode. The output of counter 804 becomes a portion of the display memory address. Row counter 820 is cleared to zero by a clear signal VSYNC and is incremented by a ROWCNT signal. The ROWCNT (row count) signal is generated once every horizontal display line in a typical case, and twice when a double scan display is specified. The output of row counter 820 and the display address line from row max register 802 are provided to inputs of comparator 821. ROW counter 820 continues counting until comparator 821 detects a coincidence between the output of row counter 820 and the maximum ROW identified by register 802. When this coincidence is detected, a ROW END signal becomes active and row counter 820 is cleared to zero. The input signals NKILLT and NKILLG that were derived from compensation logic circuit 52 (see discussion of FIG. 9) are provided to inputs to an AND gate 824. Input signals NKILLT and NKILLG effectively mask the count clock when the count clock becomes active. Any incrementing of the display address is thus stopped instantaneously causing a blank line to be inserted for the next display line.

The function of the display address counter 803 portion of the physical address generator 54 will now be discussed. At the beginning of a display period, the contents of display start address register 801 are loaded to temporary memory 812. Also initially, control signal LDNEXT becomes active. Address counter 813 then fetches the output of temporary memory 812, and then counts up in response to a count pulse DADADD. When the first line is displayed, the selection signal N1STH goes low. Meanwhile, adder 810 adds the contents of temporary memory 812 and the address register 800. At the beginning of the next display period, a select circuit 811 passes the output of adder 810. Thus, DAD plus OFFSET becomes the display start address for the next display line.

Input signals NKILLT and NKILLG from compensation logic circuit 52 (see discussion of FIG. 9) are provided to AND gate 814 and mask the low signal LDNEXT when it becomes active. Thus, incrementing of the display address is instantaneously stopped and the same line is displayed on the next display line.

It should be apparent to one skilled in the art that the address generator 54 can be configured such that the signals NKILLT and NKILLG can be ignored when the display size of the application software and the panel size are the same. In this event, no compensation will be performed.

Although the invention has been explained by reference to the foregoing embodiments, it should be understood that these are merely illustrative and are provided for example only. For example, it should be understood that the specific design of registers, logic circuits, address generators, and related circuits disclosed herein may be varied by one skilled in the art in view of this disclosure without departing from the scope of the invention. Thus it, should be understood that the invention is limited only in accordance with the appended claims.

What is claimed is:

1. In a data processing system having a computer means for processing information, a memory means for storing information, and a video display system for generating and displaying video display information, wherein the video display information is displayed on one of at least two predetermined types of video display means, the video display system comprising:
   display means;
   means, coupled to the display means, for determining a size of said display means;
   display indicating means coupled to the display means for indicating which type of display means is capable of displaying video display information;
   a first set of register means containing video display configuration information for a first type of predetermined display means, the video configuration information enabling the first type of display means to display the video display information in any one of a predefined set of display modes;
   a second set of register means containing video display modification information for a second predetermined display type, the video display modification information used for modifying the video display configuration information stored in the first set of register means to enable the display means to display the video display information for a second predetermined display type in any one of the same predefined set of display modes;
   controller means coupled to the display means, the display size determining means, the display indicating means, the first set of register means, the second set of register means, the computer means and the memory means, the controller using the video display configuration information in the first set of register means to convert the information in the computer and memory into video display information for the display means when the display means of the first predetermined type is capable of displaying video display information and the controller using the video display configuration information in the first set of register means and the modification information in the second set of register means to convert the information in the computer and memory into video display information for the display means when the display means of the second predetermined type is capable of displaying video display information and the size of the display means of the first predetermined type is different from the size of the display means of the second predetermined type.

2. The video display system of claim 1 wherein the first predetermined type of display is a cathode ray tube means and the second predetermined type of display means is a liquid crystal display means.

3. The video display system of claim 1 wherein the first predetermined type of display is a cathode ray tube means and the second predetermined type of display means is a digital flat panel display means.

4. The video display system of claim 1 wherein the predefined set of display modes comprises 17 display modes.

5. The video display system of claim 3 wherein the predefined set of display modes comprises 17 display modes.

6. The video display system of claim 1 wherein the modification information in the second set of register means comprises at least centering information, line repeating information, and blank line insertion information.

7. The video display system of claim 5 wherein the modification information in the second set of register means comprises at least centering information, line repeating information, and blank line insertion information.

* * * * *